United States Patent Office 2,727,823
Patented Dec. 20, 1955

2,727,823
RINDLESS BLOCK SWISS CHEESE

Roy G. Tulane, Griffith H. Thomas, and Merrill Richardson, Dane County, Wis., assignors to the State of Wisconsin No Drawing. Application June 28, 1954,
Serial No. 439,912

11 Claims. (Cl. 99—116)

This invention relates to cheese, and particularly to the curing of natural cheese of the expansible type in a manner that will develop a desired final form and surface condition.

One of the objects of this invention is to achieve a plane surfaced, rectangular block of natural cheese of the Swiss type and other cheeses which expand during curing that may be cut into marketable forms without waste.

Another object of the invention is to achieve a cured body of natural cheese of the Swiss type that has a minimum of or no surface conditions that are inedible and must be removed prior to marketing and merchandising.

Other objects of the invention will become apparent throughout the progress of the specifications.

Swiss, or Emmenthaler, cheese has traditionally been made for hundreds of years in the form of huge wheels weighing 160 to 200 pounds, and of a dimension of 6 to 8 inches thick and of 30 to 33 inches in diameter.

During the curing process the surface of these wheels has been exposed to the air with the result that a thick rind of ¼ to ½ inch has formed thereon, which rind represents waste, and which is inedible; and represents a loss to the purchaser if not removed prior to marketing and merchandising. Swiss cheese, or Emmenthaler cheese, as it is called after the valley of Emme in Switzerland where it was originally made, is made by treating cows' milk with certain combinations of bacteria which impart to the cheese the characteristic sweet nut-like flavor that identifies the cheese and which causes a development of "eyes" or holes in the cheese.

The preparation of the curd which will cure into Swiss cheese is an art which can only be learned under the tutelage of a skilled Swiss cheese maker, and this patent does not attempt to set forth or claim the various steps which go into the preparation of the curd.

The prior art teachings of this specification are based on the work of the State of Wisconsin, Department of Agriculture, Clemence J. Honer, Merrill Richardson, Dr. Hugo Sommer, Griffith H. Thomas, Roy G. Tulane, various employees of the state department of agriculture, and the University of Wisconsin, the prior art including the patents of Gere, Abrams, Davis, and Jones, all of which are not claimed except the discoveries of the parties signatory to this petition, but are herein set forth as an aid to persons who may desire to use the disclosures of this patent in proper time.

Since the time of Louis Pasteur it has been known that if various organic substances used as foods are sealed from the air they will not develop molds, ferments, or other undesirable conditions which will prevent their use as foods. Accordingly, we disclaim any claims to the idea of sealing, but claim only the particular method by which a body of cheese during curing may be removed from contact with the air.

The curd for Swiss cheese may be prepared either in the traditional round-bottom copper kettle which holds from 2300 to 2800 pounds of milk, or in the so-called Universal Cheese Maker or rectangular pressing tank. The operation is started by adding to the milk during the time it is being poured into the make kettle or vat a starter composed of *Streptococcus thermophilus*, *Lactobacillus bulgaricus*, and *Propionibacterium shermanii*, and thereafter rennet is added for the purpose of turning the mass of milk into a colloidal gel. Thereafter cutting and heating operations are conducted for the purpose of expressing the whey from the particles of curd.

Thereafter, the curd is removed from the whey either by the traditional Swiss method of using a dip cloth or by pouring the curd into a forming vat and expressing the whey by means of pressure plates.

It is our teaching based on all the prior art that particles of curd adhere to each other best only when they are wet with whey, and in the process of removing the particles of curd from whatever forming kettles are used, care must be taken to assure that when the curd is placed in a forming hoop the adhesion of the particles of curd is not disturbed, else there will result a defect in the finished product commonly known as "nitzler" or "nestiness."

It is a further part of our teaching that if the curd is heated too long and excessive dryness of the curd results, that another defect known as "glass" will result.

In the making of Swiss cheese in the block form it is necessary that the curd be properly prepared prior to the placing of the curd in the rectangular hoop which is the initial step in getting it in desired block form.

Swiss cheese is characterized by "eyes" which are holes or cavities in the body of the cheese, which in the desirable form range in size from the diameter of a dime to a quarter. That is, the cheese rises during the curing process in the same manner as a loaf of bread rises during the baking process.

Because of this expansion it is our teaching that the cured block of Swiss curd cannot have the same form as the uncured block, and accordingly if a particular form is desired in the cured block it is necessary to modify the form of the block as it exists prior to curing.

The particular teaching of this patent is that if one or more sides of the uncured block of Swiss curd are made concave toward the center of the body of curd, that after expansion that side or sides will assume a plane surface.

It is further a part of our teaching, all based on prior art, that the normal Swiss curd expands approximately 17 per cent during the curing process. Accordingly, the cavities on the surface of the uncured curd should approximate 15 per cent in volume of the size of the desired finished block.

We further teach that during the expansion process the volume of expansion may vary from 12 to 31 per cent and thereby there may result a slight deviation from perfection as a result of the use of our method.

Returning now to the preparation for the curing of the curd, the prior art teaches that after the curd has been removed from the kettle the whey is expressed under pressure in a forming hoop.

The pressure applied for the purpose of expressing the whey and causing the curd to knit into a homogeneous mass varies according to the seasons during which the curd has been made, and again is a matter of art which lies within the skill of the particular cheese maker.

After the curd is removed from the press, it is salted by placing it in a brine tank which consists of a saturated solution of sodium chloride.

During the manufacture of wheel Swiss, it has been customary to use a single brine tank for a long time during which various milk solids were released in the brine while the curd was being soaked therein. Based on the prior art and experience, it is our teaching that it is undesirable to salt a block of uncured curd in a tank which has measurable amounts of anything in it except a solution of sodium chloride, otherwise undesirable surface conditions on the curd will result which must be removed after the curd has been cured.

If the curd is brined in a tank which has been used for a considerable time and has received an addition of milk solids, it is necessary to scrape the curd after the brining process is completed and rub it with fresh salt.

During the brining process a thin coat of sodium chloride is formed on the surface of the cheese which thereafter distributes itself during the curing process through the body of the cheese by the process of osmosis. Further, during the brining process, the strength of the brine aids in withdrawing the remaining whey from the cheese.

The desired result is a body of cured Swiss which contains approximately one per cent of salt. If this percentage is not contained in the cured cheese, the cheese will not have the proper flavor. It is our teaching that a block of Swiss curd weighing approximately 80 pounds and made in a rectangular block form should be soaked in the brine tank for approximately three days. During this soaking process it is highly desirable that the two large surfaces of the block have an equal exposure to the brine tank.

We further direct attention to the fact that when we speak of a saturated solution we use that term in the sense that the Swiss cheese makers use it, of a solution which approximates 23 per cent and not a completely saturated solution of 26 per cent.

It is a further part of our teaching based again upon the experiments of Clemence J. Honer that the salt cannot be distributed throughout the body of the curd during the curing process, or else it will interfere with the proper development of the *Propionibacterium shermanii*, and prevent the formation of "eyes." That is, Swiss curd which is either salted in the curd or salted in the milk will not develop the character of eye formation of Swiss cheese. The salt can only be added in the form of a thin coating on the layer of the uncured body of curd which thereafter will distribute itself by the process of osmosis throughout the body of the cheese.

We suggest to the future art that it would be possible to develop a strain of salt resistant bacteria which would cause "eye" development in a curd that has been salted prior to the curing. We know of none such and do not make any claim thereto.

It is our teaching that the length of the brining period must be so adjusted that the amount of salt deposited in the surface on the body of the curd in a thin coating will be approximately one per cent of the weight of that body. This means that the brining time must be adjusted in accordance with the weight of the body of uncured curd. As we have indicated, an 80 pound block will obtain the necessary salt in approximately 3 days or 72 hours.

We teach that the salt is not deposited as a coating upon the surface of the cheese, but is absorbed into the outer ⅛ or 1/16 inch thereof.

After the body of uncured curd has been in the brine tank the appropriate time, it is desirable to dry the curd before any wrapping or sealing material is applied to the surface thereof. It is our teaching that it is possible to wrap a body of wet curd but such process involves variations in the entire process to which we make no claim.

Our description of the details of our improvement follows:

After the curd is removed from the make vat, in the desired embodiment of this invention, we applied pressure plates, which were convex, only to the two large opposed surfaces of the rectangular block. On an 80 pound block which was 14¼ inches by 24½ inches by 7 inches, it was found that the pressure plates applied to the two large surfaces, the top and the bottom, had a parabolic arc which has an extension or projection from the plane surface of approximately 85/100 inch. Again this is a matter which must be adjusted in slight degree by experiment. It will be noted that slight adjustments should be made to compensate for varying degrees of expansion.

When the body of curd has been pressed to obtain the desired concavities and thereafter has been brined, the surface of the cheese is removed from contact with the air by wrapping the cheese in Pliofilm or any film of rubber hydrochloride or any other substance which is chemically inert in the presence of butterfat or other milk solids.

We further teach that the wrapping of cheese must be conducted in such a manner that the carbon dioxide generated during the curing process may escape from the wrap. The experiments of Dr. Hugo Sommer definitely demonstrate that if allowance for the escape of excess carbon dioxide is not made that the wrapper may bloat and develop an undesirable cheese.

Turning now to the wrapping process, we point out that Pliofilm or any other material which may be used to wrap the cheese is fragile and should be protected by an outer coating of paper, cellophane, or similar material. In our selected embodiment of this invention the following wrapping procedure was used. A sheet of glassine 36 x 48 inches was laid on the wrapping table over one of the convex pressure plates which was so laid as to fit the body of uncured curd to be placed thereon. A sheet of pliofilm (rubber hydrochloride) was laid over the glassine with its edges coterminus with the glassine. A block of uncured curd of the dimension of 14¼ x 24½ x 7 inches was laid on the Pliofilm, centered thereon with its long axis at right angles to the axis of the Pliofilm and the wrapping paper. Said uncured curd had the concavities on the two large surfaces as described above. Thereafter, one long edge of the Pliofilm was folded over the surface of the cheese and pressed with the hands to express any occluded air. Then the second long end of the Pliofilm was similarly pulled over the surface of the cheese and the air again expressed. The ends were then wrapped by using a so-called shoebox fold which is the common method of wrapping parcels.

The wrap was pressed into the concavity on the top of the cheese in order to express any air. The wrap was then held in place with two pieces of Scotch tape which were applied transversely to the seam and for the sole purpose of holding the film of Pliofilm together. Thereafter the paper wrap was placed around the cheese in a similar manner.

We here point out that during the curing process Swiss curd, whether cured in the ordinary wheel form or in any other form, has a tendency to slump during the curing process unless it is supported in some manner. For the purpose of preventing this slump the cheese is placed in a curing box or mold. The curing box which we used fits the cheese so tightly that the cheese is like a piston and time must be allowed for the air to escape so that the cheese can settle into the box. This box is a flat rectangular box with inner dimensions the same as the dimensions of the body of the curd, and a depth of 8½ to 9 inches.

The box is applied to the cheese in the following manner. The convex special plate which has been used in forming the cheese is laid on top of the cheese in the concavity on the plane surface and holds down the edges of the wrap of Pliofilm and glassine. The box is inverted and then pushed down upon the body of the curd. Then the box and the curd contained therein are inverted, the cheese is allowed to settle to the bottom of the box and the other convex pressure plate used during the forming of the cheese is placed on top of the cheese.

After the cheese has been wrapped and the follower plate placed thereon, it was placed in the brine or cool room at a temperature of approximately 52 degrees and held there for approximately 7 days from the date of wrapping of the cheese.

In placing the cheese in the brine or cool room at this temperature, we were following the traditional Swiss process. We do not know if it is necessary and make no claim to this particular step, but we do know it works.

At the end of the holding period in the brine room, the cheese was removed to a so-called warm room, which in our case had a temperature of 66 degrees, where it was held for two weeks. It was then removed to another curing room which had a temperature of 71 degrees and held there for another period of two weeks. The follower plate was removed from under the cheese 11 days after it had been placed in the warm room with a temperature of 71 degrees. During the period in which the cheese was in the two warm rooms with temperatures of 66 and 71 degrees it was turned approximately once a week.

When the cheese was removed from the second warm room with a temperature of 71 degrees, after remaining there for two weeks, one surface was completely flat and the other had a slight bulge. The sides of the cheese which had been in contact with the forming mold were all completely flat. The cheese was then removed to a cooling room which had a temperature of approximately 52 degrees Fahrenheit, and was held in this room for 34 days when it was cut and examined.

The use of separate warm rooms is not necessary but was found convenient in our initial process. The cheese may be cured during the expansion period in a warm room such as that traditionally used in the art.

Upon examination it was found that the large surfaces of the cheese were practically free from mold and slight mold had devoloped on both ends. The cheese had developed good Swiss "eye" formation. The cheese was tasted and had typical Swiss cheese flavor for cheese of that time of make and age. The surface was tasted and in the opinion of some tasters had a slight bitter taste, and in the opinion of others could not be tasted at all.

We claim:

1. In the art of making rindless block cheese of the Emmenthaler type (commonly known as Swiss cheese in the United States), as an intermediate product, a body of pressed and drained uncured curd with six surfaces, the edges of which are straight lines which meet at right angles, one of the surfaces of which is concave towards the center of the body in such degree that the volume of the concavity is substantially 15 percent of the volume of the block.

2. In the art of making rindless block cheese of the Emmenthaler type (commonly known as Swiss cheese in the United States), convex pressure plates for forming concavities in the body of the uncured curd which are rectangular form, the convexity of which plates are parabolic arcs extending to the edge of the pressure plates of such size that the volume bounded by the plane surfaces of the pressure plates and the convex surfaces is approximately 15 per cent of the body of the cheese to which they are applied.

3. In the art of making rindless block cheese of the Emmenthaler type (commonly known as Swiss cheese in the United States), a forming device which comprises a mold, which is square or rectangular in shape and has one open surface, the interior dimensions of which are the same as the dimensions of the cheese which is to be introduced therein, a convex pressure plate placed in the bottom of said mold and a convex pressure plate which is applied on top of the cheese after it has been placed in such mold, said pressure plates being of such size that the volume bounded by the plane surfaces thereof and the convex surfaces thereof is approximately 15 per cent of the volume of the body of curd to which they are applied.

4. In the art of making rindless block cheese of the Emmenthaler type (commonly known as Swiss cheese in the United States), the process of making a cured body of cheese which has a rectangular block form bounded by 6 substantially plane surfaces which adjoin at right angles, by placing the prepared Swiss curd in a rectangular hoop with a convex pressure plate applied to the surface of the curd, placing the shaped curd in a brine tank, drying the surface of the brined curd, wrapping the cheese in a flexible, extensible and chemically inert, oxygen and moisture proof wrapping material without sealing the edges, placing the wrapped curd in a forming mold, of the same size and shape as the cheese, thereafter transferring the cheese to a warm room until the concave surface has expanded to a plane surface, then transferring the cured and expanded cheese to a cooling room for aging.

5. In a process for producing natural cheese of the expanding type which is cured in extensible and flexible chemically inert oxygen and moisture proof material in confining forms; the step of pressing the cheese so as to form a concave surface so that the total volume of the concavity is substantially equal to the volume that the cheese will expand to during curing.

6. In the art of making rindless block cheese of the Emmenthaler type (commonly known as Swiss cheese in the United States), as an intermediate product, a body of pressed and drained uncured curd with six surfaces, the edges of which are straight lines which meet at right angles, a plurality of the surfaces of which are concave towards the center of the body in such degree that the volume of the concavities is substantially 15% of the volume of the block.

7. The forming device of claim 3 of which the mold is a curing box.

8. In the art of making rindless block cheese of the Emmenthaler type (commonly known as Swiss cheese in the United States), the process of making a cured body of cheese which has a rectangular block form bounded by 6 substantially plane surfaces which adjoin at right angles, by placing the prepared curd in a rectangular hoop with a plurality of convex pressure plates applied to the surface of the curd, placing the shaped curd in a brine tank, drying the surface of the brined curd, wrapping the cheese in a flexible, extensible and chemically inert, oxygen and moisture proof wrapping material without sealing the edges, placing the wrapped curd in a forming mold, of the same size and shape as the cheese, thereafter transferring the cheese to a warm room until the concave surfaces have expanded to plane surfaces, then transferring the cured and expanded cheese to a cooling room for aging.

9. In a process for producing natural cheese of the expanding type, the step of pressing the cheese so as to form a concave surface so that the total volume of the concavity is substantially equal to the volume that the cheese will expand to during curing.

10. In a process for producing natural cheese of the expanding type, the step of pressing the cheese so as to form a plurality of concave surfaces so that the total volume of the concavities is substantially equal to the volume that the cheese will expand to during curing.

11. The process of claim 10 wherein the cheese is cured in extensible and flexible chemically inert oxygen and moisture proof material in confining forms.

References Cited in the file of this patent

UNITED STATES PATENTS

| Re. 23,489 | Toone | Apr. 29, 1952 |
| 1,492,388 | Popper | Apr. 29, 1924 |
| 1,808,993 | Murray | June 9, 1931 |
| 1,915,487 | Gere | June 27, 1933 |
| 2,423,300 | Faehndrich | July 1, 1947 |
| 2,424,693 | Jones | July 29, 1947 |
| 2,688,557 | Peters | Sept. 7, 1954 |